US012206714B1

(12) United States Patent
Grover et al.

(10) Patent No.: US 12,206,714 B1
(45) Date of Patent: Jan. 21, 2025

(54) METHODS, SYSTEMS, AND COMPUTER READABLE MEDIA FOR HANDLING INTERNET PROTOCOL (IP) MULTIMEDIA SUBSYSTEM (IMS) REGISTRATION AT PROXY CALL SESSION CONTROL FUNCTION (P-CSCF) FOR ROAMING USERS AFTER POLICY AND CHARGING RULES FUNCTION (PCRF) DATABASE FAILURE

(71) Applicant: Oracle International Corporation, Redwood Shores, CA (US)

(72) Inventors: Lalit Grover, Gurgaon (IN); Vimal Chandra Tewari, Bangalore (IN); Jayesh Shrimali, Telangana (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/223,534

(22) Filed: Jul. 18, 2023

(51) Int. Cl.
*H04L 65/1073* (2022.01)
*H04L 65/1016* (2022.01)
*H04L 65/1045* (2022.01)
*H04L 65/1104* (2022.01)

(52) U.S. Cl.
CPC ...... *H04L 65/1016* (2013.01); *H04L 65/1045* (2022.05); *H04L 65/1073* (2013.01); *H04L 65/1104* (2022.05)

(58) Field of Classification Search
None
See application file for complete search history.

(56) References Cited

U.S. PATENT DOCUMENTS

| | | | |
|---|---|---|---|
| 2010/0017527 A1* | 1/2010 | Kinoshita | H04L 61/45 370/328 |
| 2013/0019003 A1* | 1/2013 | Bouvet | H04L 65/1016 709/223 |
| 2015/0085856 A1* | 3/2015 | Bouvet | H04L 65/1053 370/352 |
| 2022/0038509 A1* | 2/2022 | Maroto Gil | H04L 65/1069 |
| 2023/0043429 A1* | 2/2023 | Mirza | H04L 65/1073 |

OTHER PUBLICATIONS

Jennings et al., Managing Client-Initiated Connections in the Session Initiation Protocol (SIP) IETF RFC 5626, Oct. 2009.
"Oracle Communications Unified Session Manager", S-CZ8.2.5, pp. 1-284 (Apr. 2021).

* cited by examiner

*Primary Examiner* — Joshua Joo
(74) *Attorney, Agent, or Firm* — Jenkins, Taylor & Hunt, P.A.

(57) ABSTRACT

A method for handling IMS registrations at a P-CSCF after PCRF database failure includes receiving a SIP REGISTER request message after a PCRF database failure and determining that the SIP REGISTER request message is for an existing user. The method further includes obtaining a list of user contacts having entries in a registration cache of the P-CSCF corresponding to an address of record in the SIP REGISTER request message, testing reachability of the user contacts in the list, and freeing resources of the P-CSCF for the user contacts determined to be unreachable.

20 Claims, 7 Drawing Sheets

METHODS, SYSTEMS, AND COMPUTER READABLE MEDIA FOR HANDLING INTERNET PROTOCOL (IP) MULTIMEDIA SUBSYSTEM (IMS) REGISTRATION AT PROXY CALL SESSION CONTROL FUNCTION (P-CSCF) FOR ROAMING USERS AFTER POLICY AND CHARGING RULES FUNCTION (PCRF) DATABASE FAILURE

TECHNICAL FIELD

The subject matter described herein relates to managing resources associated with user contacts in a communications network. More particularly, the subject matter described herein relates to handling IMS registration at the P-CSCF after a PCRF database failure in a manner that frees resources associated with unreachable user contacts.

BACKGROUND

In IMS networks, an IMS user may utilize address of record (AOR) to identify the user to the network. The AOR may be used on a single physical device or may be used across physical device. For a given AOR, the user may register multiple contacts with the network, where a contact is an association with the network and is identified by a unique IP address. For example, a user may create a first contact for web browsing and a different contact for VoIP calls.

The user registers with the IMS core network through a P-CSCF. During registration, the P-CSCF maintains a registration cache for all user contacts registered for an AOR and creates an Rx session with a PCRF for each contact. As part of Rx session creation, the P-CSCF requests that the PCRF notify the P-CSCF of a release of bearer event (i.e., when the bearer channel between the user device and the network is disconnected) for the corresponding contact. If the PCRF notifies the P-CSCF of a release of bearer event for a contact, then the P-CSCF frees its resources (such as registration cache storage) associated with the contact.

The PCRF maintains an Rx session database for Rx sessions created by the P-CSCF for registered user contacts. When a PCRF Rx session database failure occurs, the PCRF could lose all of its records for registered Rx sessions. The PCRF is thus unable to notify the P-CSCF of release of bearer events for user contacts. As a result, the P-CSCF may have records or entries in its registration cache for user contacts that are stale, i.e., user contacts for which the bearer channel has been released or otherwise disconnected. Maintaining registration cache entries for stale user contacts wastes P-CSCF resources. In addition, if the P-CSCF attempts to complete a call to a stale user contact, network resources are wasted. The problem is magnified by the number of AORs and user contacts that can be handled by a P-CSCF at a given time.

Accordingly, in light of these and other difficulties, there exists a need for improved methods, systems, and computer readable media for handling IMS registration at a P-CSCF after a PCRF database failure in a manner that frees resources associated with stale user contacts.

SUMMARY

The subject matter described herein includes early detection and cleanup of resources associated with stale registrations at a P-CSCF after a PCRF database failure causing loss of event subscriptions at the PCRF. The proposed solution helps in optimizing resource utilization at the P-CSCF by freeing resources, such as processing and memory resources, associated with stale registrations, i.e., user contacts, as well as in restoring the subscriptions at the PCRF for future bearer notifications to the P-CSCF.

A method for handling IMS registrations at a P-CSCF after PCRF database failure includes receiving, by the P-CSCF and after a PCRF database failure, a session initiation protocol (SIP) REGISTER request message. The method further includes determining, by the P-CSCF, that the SIP REGISTER request message is for an existing user. The method further includes, in response to determining that the SIP REGISTER request message is for an existing user: obtaining, by the P-CSCF, a list of user contacts having entries in a registration cache of the P-CSCF corresponding to an address of record in the SIP REGISTER request message; testing, by the P-CSCF, reachability of the user contacts in the list and determining that at least one of the user contacts is unreachable; and freeing, by the P-CSCF, resources of the P-CSCF for the user contacts determined to be unreachable.

According to another aspect of the subject matter described herein, the method for handling IMS registrations at a P-CSCF after a PCRF database failure includes detecting, by the P-CSCF, loss of connectivity with the PCRF, determining, by the P-CSCF, that the PCRF database failure has occurred, and, in response to determining that the PCRF database failure has occurred, setting, by the P-CSCF, a pending verification flag for user contact entries in the registration cache.

According to another aspect of the subject matter described herein, detecting loss of connectivity with the PCRF comprises detecting loss of a transport layer connection with the PCRF.

According to another aspect of the subject matter described herein, detecting, by the P-CSCF, that a PCRF database failure has occurred includes receiving a Diameter message from the PCRF, reading an Origin-State-Id from the Diameter message, and determining that the Origin-State-Id in the Diameter message differs from an Origin-State-Id of a previous Diameter connection with the PCRF.

According to another aspect of the subject matter described herein, the method for handling IMS registrations after a PCRF database failure includes, in response to determining that the SIP REGISTER request message is not for an existing user, starting a new Rx session for the user contact with the PCR, starting a new Rx session with the PCRF for a user contact identified in the SIP REGISTER request message.

According to another aspect of the subject matter described herein, testing reachability of the user contacts in the list includes transmitting a message to the user contact, starting a response timer for the user contact, and determining that the user contact is unreachable in response to failing to receive a response from the user contact prior to expiration of the response timer.

According to another aspect of the subject matter described herein, transmitting a message to the user contact includes transmitting a SIP OPTIONS request message to the user contact.

According to another aspect of the subject matter described herein, the method for handling IMS registrations after a PCRF database failure includes determining that the user contact is reachable when a response to the SIP OPTIONS request message is received from the user contact prior to expiration of the response timer.

According to another aspect of the subject matter described herein, freeing resources associated with the user contact includes deleting an entry in the registration cache corresponding to the user contact and sending a deregister message, i.e., a SIP REGISTER request message with an expires parameter set to zero, to a serving/interrogating CSCF (S/I-CSCF) to deregister the user contact.

According to another aspect of the subject matter described herein, the method for handling IMS registrations after a PCRF database failure includes receiving, by the P-CSCF, a SIP message from a user contact corresponding to one of the user contact entries in the list for which the pending verification flag is set or completing a mobile terminated call to the user contact, and, in response, resetting the pending verification flag for the entry and refraining from testing the user contact for reachability.

According to another aspect of the subject matter described herein, a system for handling IMS registrations at a P-CSCF after a PCRF database failure is provided. The system includes a P-CSCF including at least one processor and a memory. The system further includes a user contact registration cache stored in the memory and having entries corresponding to user contacts registered with an IMS network. The system further includes a user contact registration manager stored in the memory and executable by the at least one processor for receiving a SIP REGISTER request message after a PCRF database failure, determining that the SIP REGISTER request message is for an existing user, in response to determining that the SIP REGISTER request message is for an existing user: obtaining a list of user contacts having entries in a registration cache of the P-CSCF corresponding to an address of record in the SIP REGISTER request message; testing reachability of the user contacts having user contact entries in the list and determining that at least one of the user contacts is unreachable; and freeing resources of the P-CSCF for the user contacts determined to be unreachable.

According to another aspect of the subject matter described herein, the user contact registration manager is configured to: detect loss of connectivity with the PCRF; determine that the PCRF database failure has occurred; and, in response to determining that the PCRF database failure has occurred, set a pending verification flag for user contact entries in a registration cache maintained by the P-CSCF.

According to another aspect of the subject matter described herein, the user contact registration manager is configured to detect loss of connectivity with the PCRF by detecting loss of a transport layer connection with the PCRF.

According to another aspect of the subject matter described herein, the user contact registration manager is configured to detect that a PCRF database failure has occurred by receiving a Diameter message from the PCRF, reading an Origin-State-Id from the Diameter message, determining that the Origin-State-Id in the Diameter message differs from an Origin-State-Id of a previous Diameter connection with the PCRF.

According to another aspect of the subject matter described herein, the user contact registration manager is configured to, in response to determining that the SIP REGISTER request message is not for an existing user, start a new Rx session for the user contact with the PCRF.

According to another aspect of the subject matter described herein, the user contact registration manager is configured to test reachability of the user contacts in the list by: transmitting a message to the user contact, starting a response timer for the user contact, determining that the user contact is unreachable in response to failing to receive a response from the user contact prior to expiration of the response timer.

According to another aspect of the subject matter described herein, the message transmitted to the user contact comprises a SIP OPTIONS request message.

According to another aspect of the subject matter described herein, the user contact registration manager is configured to determine that the user contact is reachable when a response to the SIP OPTIONS request message is received from the user contact prior to expiration of the response timer.

According to another aspect of the subject matter described herein, the user contact registration manager is configured to free resources associated with the user contact by deleting an entry in the registration cache corresponding to the user contact.

According to another aspect of the subject matter described herein, a non-transitory computer readable medium having stored thereon executable instructions that when executed by a processor of a computer controls the computer to perform steps is provided. The steps include receiving, by a P-CSCF and after a PCRF database failure, a SIP REGISTER request message. The steps further include determining, by the P-CSCF, that the SIP REGISTER request message is for an existing user. The steps further include, in response to determining that the SIP REGISTER request message is for an existing user: obtaining, by the P-CSCF, a list of user contacts having entries in a registration cache of the P-CSCF corresponding to an address of record in the SIP REGISTER request message; testing, by the P-CSCF, reachability of the user contacts in the list and determining that at least one of the user contacts is unreachable; and freeing, by the P-CSCF, resources of the P-CSCF for the user contacts determined to be unreachable.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

In a typical voice over long term evolution (VOLTE) deployment, the session border controller (SBC), deployed as a P-CSCF, maintains a cache of user registrations for each user and its contact addresses. An IMS user is represented using an AOR, and an IMS user may register multiple contacts with different addresses. Each such contact is referred to herein as a "user contact".

At the time of a new registration, the SBC receives a SIP REGISTER request and adds an entry into the registration cache that binds an AOR with one or more user contacts. During registration, the SBC also initiates an Rx session with the PCRF to learn the access network information and to subscribe to notifications for bearer modification in the access network. One such subscription is for INDICATION_OF_RELEASE_OF_BEARER. Once the P-CSCF subscribes for the INDICATION_OF_RELEASE_OF_BEARER with the PCRF, the PCRF is required to indicate to the P-CSCF when the bearer corresponding to a user contact is released, or in simple terms, when the connectivity with the user contact is lost.

Loss of connectivity with a user contact could occur because the user turns off the device or roams to a different network. When the P-CSCF receives a notification from the PCRF about the release of bearer for a user contact, it deregisters the user contact, informs the registrar, and deletes the corresponding record from its local registration cache. The subscription and notification flows are depicted in FIG. 1.

Figure 1:
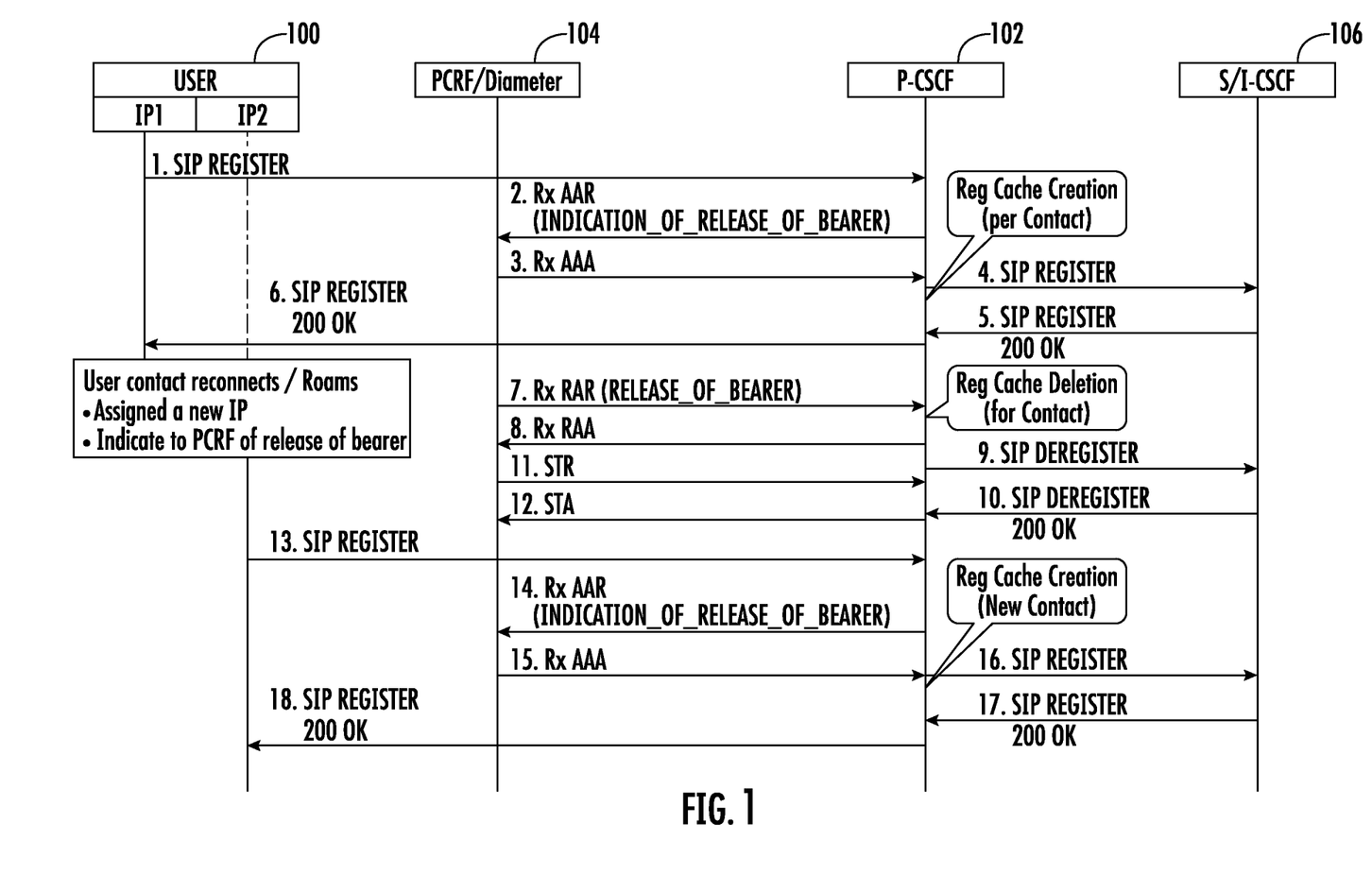
FIG. 1 is a message flow diagram illustrating exemplary messages exchanged when an IMS user device registers a user contact with the network, the user device disconnects from the network, roams to a new network or reconnects to the original network with a new IP address, and registers the user contact with the new network or the existing network using the new IP address.

Referring to FIG. 1, in line 1, a user device initiates registration with the network using the IP address IP1 and sends a SIP REGISTER request including the IP address IP1 to a P-CSCF 102. In line 2, P-CSCF 102 initiates an Rx connection with a PCRF 104 by sending an authorization authentication request (AAR) message to PCRF 104. The AAR message includes a specific action attribute value pair (AVP) which may include an INDICATION_OF_RELEASE_OF_BEARER value. The INDICATION_OF_RELEASE_OF_BEARER value instructs PCRF 104 to notify P-CSCF 102 when a release of bearer channel for a user contact occurs. In line 3, PCRF 104 sends an authorization authentication answer (AAA) message to P-CSCF 102. P-CSCF 102 receives the AAA message and, in response to receiving the AAA message, P-CSCF 102 creates an entry in its registration cache for the user contact that uses IP1.

In line 4, P-CSCF 102 sends a SIP REGISTER request to a serving/interrogating (S/I)-CSCF 106, which functions as the registrar for the IMS network. In line 5, S/I-CSCF 106 responds to P-CSCF 102 with a 200 OK message indicating successful completion of the registration. In line 6, P-CSCF 102 sends a 200 OK message to user device 100 confirming successful completion of the registration.

In the example illustrated in FIG. 1, it is assumed that user device 100 roams into a new network or disconnects and reconnects to the same network using a different IP address. In FIG. 1, the different IP address is IP2. Accordingly, in line 7, PCRF 104 sends a reauthorization request (RAR) message to P-CSCF 102 with an INDICATION_OF_RELEASE_OF_BEARER indicating loss of communication with user device 100 at IP1. In response to the INDICATION_OF_RELEASE_OF_BEARER, P-CSCF 102 deletes its registration cache entry for the user contact that used IP1. In line 8, P-CSCF 102 sends a reauthorization answer (RAA) message to PCRF 104.

In line 9, P-CSCF 102 sends a SIP deregister request to S/I-CSCF 106 to deregister the user contact that used IP1. As stated above, the SIP deregister request may be a SIP REGISTER request with an expires parameter set to zero. In line 10, S/I-CSCF 106 sends a 200 OK message to P-CSCF 102 confirming successful deregistration of the contact for user device 100 corresponding to IP1.

In line 11, PCRF 104 sends a Diameter session termination request (STR) message to P-CSCF 102 to terminate the Rx session created for the user contact that used IP1. In line 12, P-CSCF 102 sends a Diameter session termination answer (STA) message to PCRF 104 confirming successful termination of the Rx session.

In line 13, user device 100 sends a SIP REGISTER request including the IP address IP2 to P-CSCF 102. In line 14, P-CSCF 102 initiates an Rx session with PCRF 104 by sending an AAR message to PCRF 104. The AAR message includes the INDICATION_OF_RELEASE_OF_BEARER value. In response to receiving the AAA message, P-CSCF 102 creates an entry in its registration cache for the user contact that uses IP2. In line 15, PCRF 104 confirms successful creation of the Rx session by sending an AAA message on the Rx interface to P-CSCF 102. In line 16, P-CSCF 102 sends a SIP REGISTER request to S/I-CSCF 106 to register the user contact that uses IP2. In line 17, S/I-CSCF 106 responds to P-CSCF 102 with a 200 OK message indicating successful completion of the registration. In line 18, P-CSCF 102 sends a 200 OK message to user device 100 confirming successful creation of the registration. Thus, FIG. 1 illustrates the case where a user device connects to one network, disconnects from that network, and connects to another network (or reconnects to the same network using a different IP address). The registration cache entry at P-CSCF 102 is deleted when the user device disconnects from the network, P-CSCF 102 receives notification of release of the bearer channel for the user contact that used IP1.

Hereinafter, "SBC" and "P-CSCF" are used interchangeably to refer to the network node that maintains the registration cache and subscribes with the PCRF to receive the INDICATION_OF_RELEASE_OR_BEARER.

Figure 2:
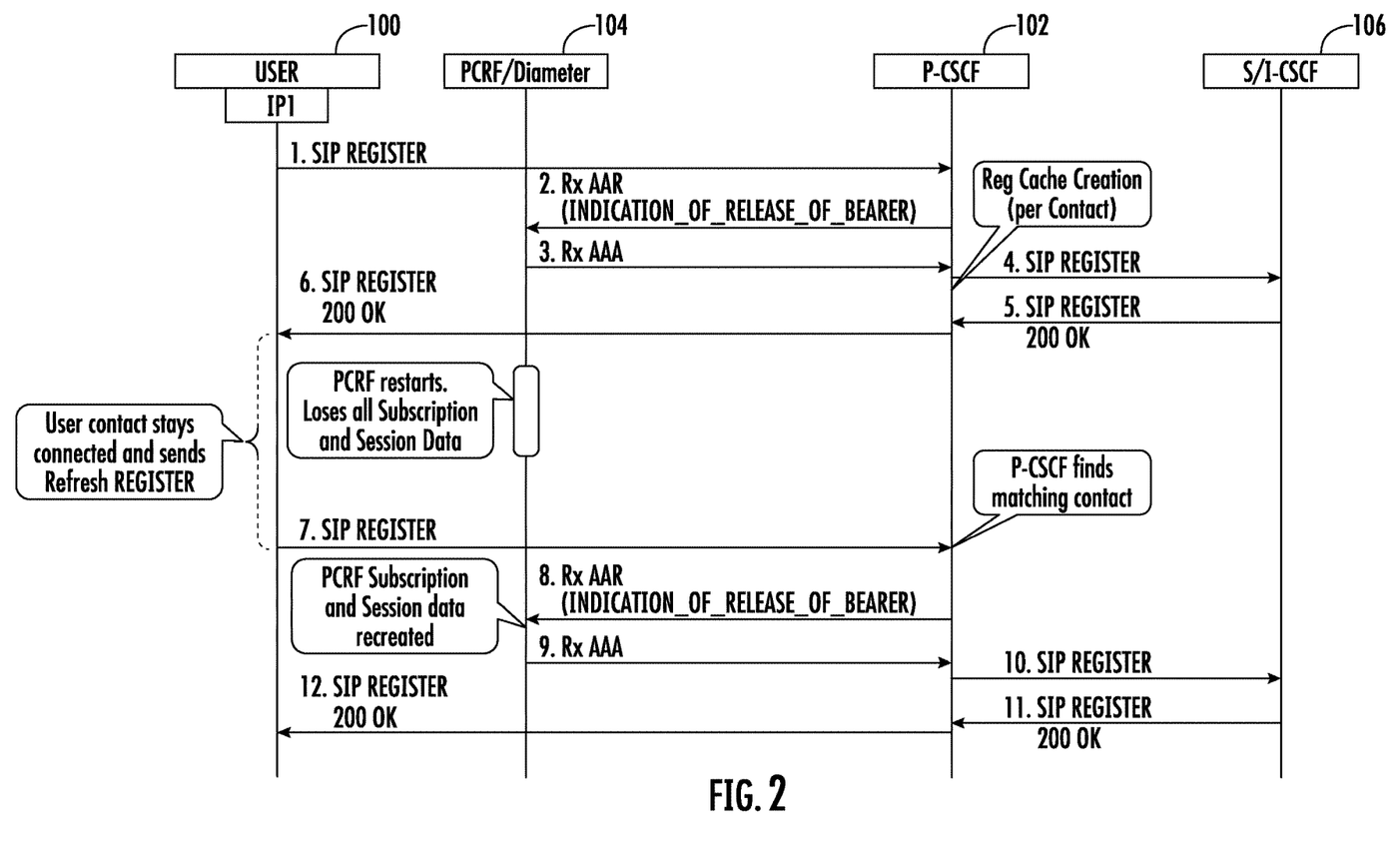
FIG. 2 is a message flow diagram illustrating exemplary messages exchanged when an IMS user device registers a user contact with the network, a PCRF database failure occurs, the IMS user device remains connected to the network and refreshes the registration of the user contact with the network without roaming or reconnecting with a new IP address.
Figure 3:
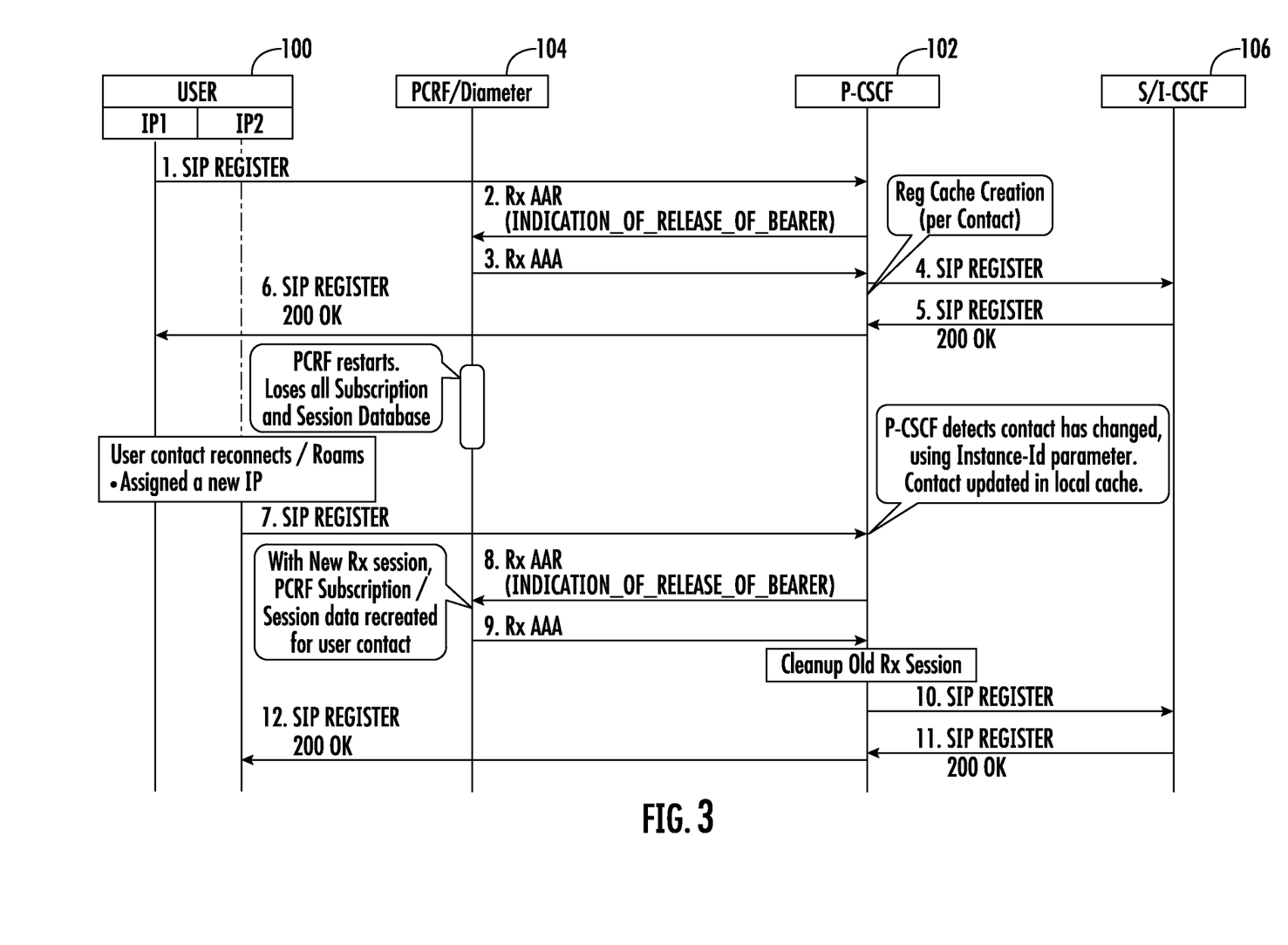
FIG. 3 is a message flow diagram illustrating exemplary messages exchanged when an IMS user device registers with the network, a PCRF database failure occurs, the user device roams to a new network or connects with a new IP address, and the P-CSCF is able to detect, using an instance-ID parameter, that the original user contact has changed and frees resources associated with the original user contact.
Figure 4:
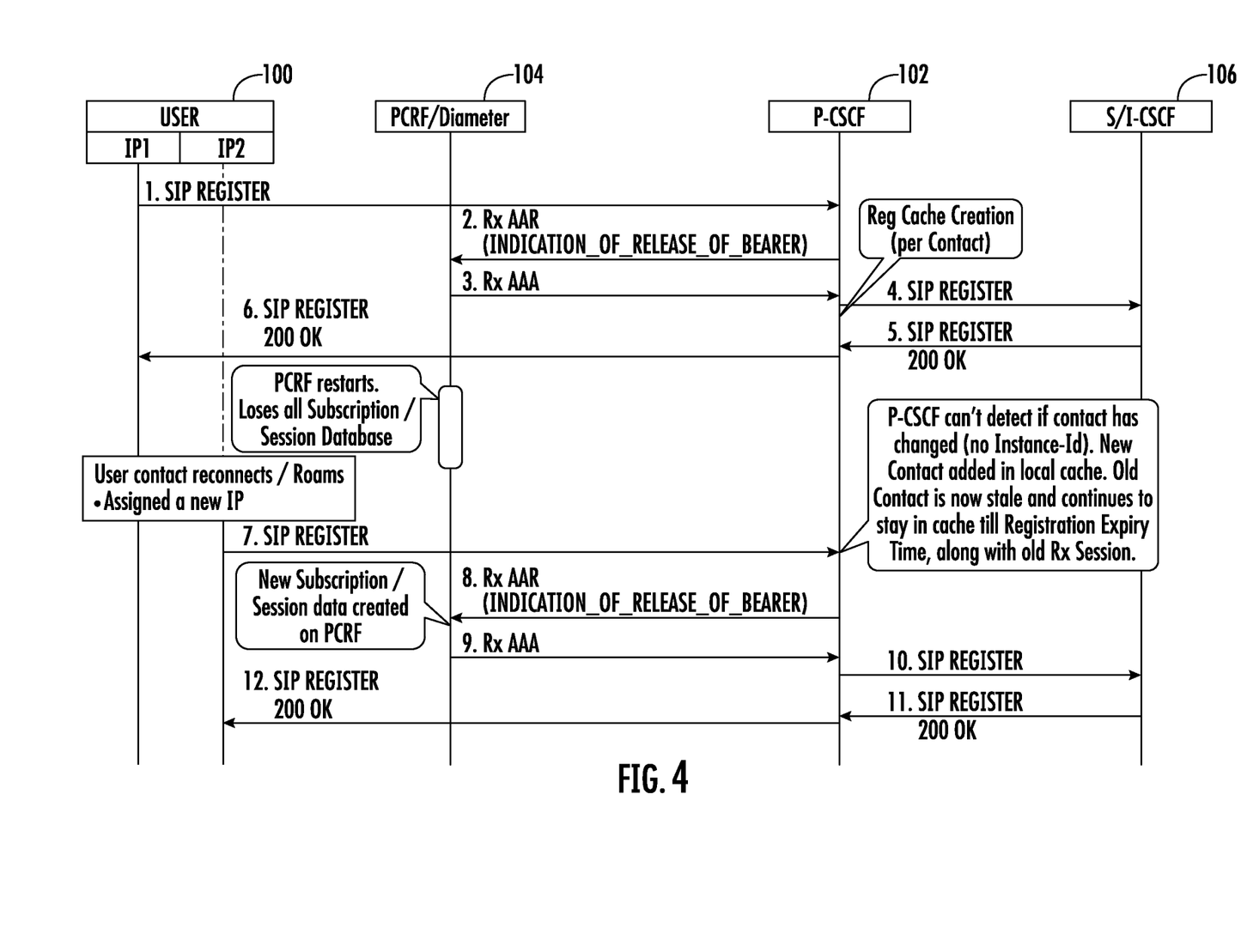
FIG. 4 is a message flow diagram illustrating exemplary messages exchanged when an IMS user device registers with the network, a PCRF database failure occurs, the user device roams to a new network or connects with a new IP address, and the P-CSCF is not able to detect that the original user contact has changed and thus cannot free resources associated with the original user contact.

In some instances, the PCRF can go out-of-service and lose the Rx session statuses along with the registered subscriptions for user contacts associated with an AOR. Although it is expected of PCRF implementations to ensure sufficient redundancy to prevent such data loss, it is not uncommon for data loss to occur at some PCRF implementations, primarily due to complicated geo-redundancy requirements. The subscription data loss could occur due to any number of reasons, such as a shared database failure or a multi-site data synchronization issue. In such a case, the PCRF will eventually resume its service, but since it lost the subscription information, it would never send any notifications to the P-CSCF for the old user contacts that were registered before the data loss. Because the P-CSCF is not notified of the data loss at the PCRF, the P-CSCF will continue to assume that the user contact is still reachable since the P-CSCF has not received any indication of loss of bearer from the PCRF. In other words, the P-CSCF would unnecessarily continue to hold the stale information for deregistered user contacts until the registration expires, which depends on a registration-expires timeout value that typically ranges from a few hours to a day or more. During this window, the SBC would also try to route mobile terminated (MT) calls to a user contact that is not reachable using the available information in the registration cache. This is the problem addressed by the subject matter described herein. It is to be noted however, that in some cases, the problem would autocorrect for user contacts that send new SIP REGISTER requests, and the SBC is able to correlate the new request with an already registered user contact. The following are scenarios that could occur:

1) Case 1:
   The PCRF restarts without losing the session/subscription database. There are no problems in this scenario because the P-CSCF would reestablish the transport connection to the PCRF, and the old Rx sessions would remain intact.
2) Case 2: The PCRF restarts and loses its session/subscription database.
   a. Case 2a: The user contact stays connected, i.e., there is no release of bearer. This is a non-problematic scenario, assuming that the user contact remains connected until the next registration refresh, resulting in the SBC sending a new AAR (restoring the subscription) to the PCRF. If the user contact loses connectivity before the new AAR request is transmitted to the PCRF, this becomes one of the problematic scenarios mentioned below. The case where the user contact remains connected during and after the PCRF database failure is illustrated in FIG. 2. In FIG. 2, lines 1-6 are the same as described above with respect to FIG. 1 in which user device 100 connects to the network, and P-CSCF 102 creates a subscription with PCRF 104 to receive notification of a release of a bearer channel for the user contact that uses IP1, creates an entry in its local registration cache, and registers the new user contact with S/I-CSCF 106. It is assumed that PCRF 104 loses its session/subscription database, and user device 100 remains connected to the network, and, in line 7, sends a SIP REGISTER request to P-CSCF 102 to refresh the registration. In response to the SIP REGISTER request, in line 8, P-CSCF 102 finds a matching entry in its local registration cache for the user contact that uses IP1 and sends an AAR message to PCRF 104 requesting to be notified of a release of bearer channel for the bearer connection involving IP1. In line 9, PCRF 104 sends an AAA message to P-CSCF 102 confirming creation of the subscription. Because the subscription was recreated, the loss of the session/subscription database by PCRF 104 does not adversely affect communications involving the user contact that uses IP1. In lines 10 and 11, P-CSCF 102 refreshes the registration with S/I-CSCF 106. In line 12, P-CSCF 102 sends a 200 OK message to user device 100.
   b. Case 2b: A user contact disconnects and then reconnects in the same or a different network. i.e., the old bearer has been released and a new one established. In this scenario, it is expected that the user will re-register with the P-CSCF with a new contact address. There are two possibilities here on how the P-CSCF could handle this:
      i. If the SBC is able to detect that the new registration pertains to an already registered user contact (e.g., based on the instance-id as specified in IETF RFC 5626), the SBC will update the existing record corresponding to the user contact in the registration cache. According to IETF RFC 5626, the instance-id is a unique identifier for a device that does not change when the device moves to another network. IETF RFC 5626 also specifies that the Contact header of a registration request can include a reg-id parameter that is used to uniquely identify different flows registered by a user agent. Thus, if the registration includes the same instance-id and the same reg-id as a previous registration, the SBC may determine that the registration is a new registration for an existing flow. If the registration includes the same instance-id and a different reg-id from existing flows, the SBC may determine that the registration is a new registration not intended to replace an existing registration. If the SBC detects that the new registration is associated with the same instance-id and reg-id as the old registration, the SBC will clean up the old Rx session and create a new Rx session with the PCRF, which would restore the subscription for the INDICATION_OF_RELEASE_OF_BEARER. Hence, for this user contact, the P-CSCF will return to the state it was in before the PCRF lost this subscription database. This case is depicted in FIG. 3. In FIG. 3, lines 1-6 are the same as described above with respect to FIG. 1 in which user device 100 connects to the network, and P-CSCF 102 creates a subscription with PCRF 104 to receive notification of a release of a bearer channel for the user contact that uses IP1, creates an entry in its local registration cache, and registers the new contact with S/I-CSCF 106. After line 6, it is assumed that PCRF 104 loses its session/subscription database, and user device 100 disconnects from the network, roams, and reconnects with the network using a new IP address IP2. In line 7, user device 100 sends a SIP REGISTER request to P-CSCF 102 to register the new user contact that uses IP2 with the network. In response to the SIP REGISTER request, P-CSCF 102 determines that the contact for user device 100 has changed because the SIP REGISTER request includes the same instance-id and the same reg-id as the user contact that registered using IP1, updates the record for the user contact in its local registration cache, and, in line 8, P-CSCF 102 sends an AAR message to PCRF 104 requesting to be notified of a release of bearer channel for the bearer connection used by the user contact that registered with IP2. In line 9, PCRF 104 sends an AAA message to P-CSCF 102 confirming creation of the subscription. After line 9, P-CSCF 102 frees resources associated with the user contact involving IP1 and creates a new Rx session database entry for the user contact using the IP address IP2. In lines 10 and 11, P-CSCF 102 registers the new contact with S/I-CSCF 106. In line 12, P-CSCF 102 sends a 200 OK message to user device 100.

ii. If the SBC is unable to correlate the new registration request with an already registered user contact, the SBC will treat the contact identified in the new registration request as a new user contact and will create a new Rx session by sending an AAR with a new session ID to the PCRF. One of the reasons why the SBC might fail to identify the user contact could be the lack of support for the RFC 5626 instance-id in the user equipment. In this case, the old registration record, along with the old Rx session, will continue to exist in the SBC until the registration expires. This is the problematic scenario depicted in FIG. 4. In FIG. 4, lines 1-6 are the same as described above with respect to FIG. 1 in which user device 100 connects to the network, and P-CSCF 102 creates a subscription with PCRF 104 to receive notification of a release of a bearer channel for the user contact that registered using IP1, creates an entry in its local registration cache, and registers the new contact with S/I-CSCF 106. After line 6, it is assumed that PCRF 104 loses its session/subscription database, user device 100 disconnects from the network, roams, and reconnects with the network using a new IP address IP2. In line 7, user device 100 sends a SIP REGISTER request to P-CSCF 102 to register a new user contact with the network. In response to the SIP REGISTER request, because P-CSCF 102 cannot detect that the user contact in the new REGISTER request is intended to replace the existing user contact, P-CSCF 102 does not delete the registration cache entry for the user contact involving IP1 and creates a new cache entry for the user contact that uses IP2. The cache entry for the user contact that uses IP1 will be maintained in the registration cache until the registration time expires, even though the contact is stale. In line 8, P-CSCF 102 sends an AAR message to PCRF 104 requesting to be notified of a release of bearer channel for the bearer connection involving the user contact that uses IP2. In line 9, PCRF 104 sends an AAA message to P-CSCF 102 confirming creation of the subscription. In lines 10 and 11, P-CSCF 102 registers the new contact with S/I-CSCF 106. In line 12, P-CSCF 102 sends a 200 OK message to user device 100. If a call is attempted to the user contact using IP1, the call will fail because user device 100 no longer uses the user contact involving IP1.

c. Case 2c: User switches off the device.

In this scenario, the SBC would not get an indication about the release of bearer, and the stale registration record will be maintained in the local registration cache of the SBC until the registration expiry. This is another potentially problematic scenario that is not addressed by the solution described herein. As mentioned above, Case 2(b) (ii) defines the primary problem that the solution described herein is intended to address. It is to be noted that the above-mentioned problem can have a significant impact since it can potentially manifest for many users that reconnect (due to roaming or reconnection in the same network) during or after the PCRF database failure event.

The solution described herein handles the above-mentioned problematic scenario by using the following approach at the P-CSCF. The SBC/P-CSCF will keep track of transport layer connection failures with the PCRF. As a standard behavior, in the event of a PCRF restart or a switchover, the transport layer connection and the subsequent Diameter connection are reestablished. The SBC will look at the Diameter Origin-State-Id AVP received from the PCRF during the Diameter capabilities exchange request/capabilities exchange answer (CER/CEA) handshake to infer if the PCRF underwent a cold restart and could have possibly lost the subscription database. The Origin-State-Id AVP is a monotonically increasing value that is advanced whenever a Diameter entity restarts with loss of previous state. The AVP may be included in any Diameter message, including the CER. It enables Diameter entities that receive the message to infer from a changed AVP value that sessions associated with a lower value are no longer active.

When the SBC detects a change in the Origin-State-Id value, it shall mark all registered user contacts as "pending verification" in the registration cache. On receipt of a new registration request for a user, if the SBC finds an existing registration with the same AOR as received in the request but is unable to correlate the contact in the request with a registered user contact, the SBC will start a new Rx session with the PCRF and also send a SIP OPTIONS message to all the old contacts for that user (proposed behavior). The second step above would be to confirm if these user contacts are still reachable. If the OPTIONS response is received, the SBC will reset the user contact's "pending verification" status and send an AAR to PCRF to restore the subscription.

If there is no response (i.e., the request times out), the old user contact will be deregistered and deleted from the registration cache. In another scenario, if the SBC receives any SIP request or response from a registered user contact (indicating that the user contact is still connected) that leads SBC to send an AAR to the PCRF, and the SBC will also reset the "pending verification" status for this user contact. Sending an AAR would restore the subscription on the PCRF.

As a further optimization, sending an OPTIONS message could be skipped for user contacts whose registration expiry is near-due. That is, if a user contact is within a predetermined time period of its expiration, the SBC may refrain from sending the SIP OPTIONS message for the user contact. This is because the user contact's registration will be confirmed shortly depending on whether the SBC receives a refresh registration or not before the expiry.

As another optional optimization, if a MT call to a user contact for which "pending-verification" status is set fails before the SBC receives a re-registration request or sends a SIP OPTIONS request to the user contact, the user contact will be deregistered, and the entry for the user contact will be deleted from the registration cache. If the MT call attempt fails because the user contact is not connected to the network, there is no reason to test the user contact for reachability, and the P-CSCF can free the registration cache resources used by the user contact.

Figure 5:
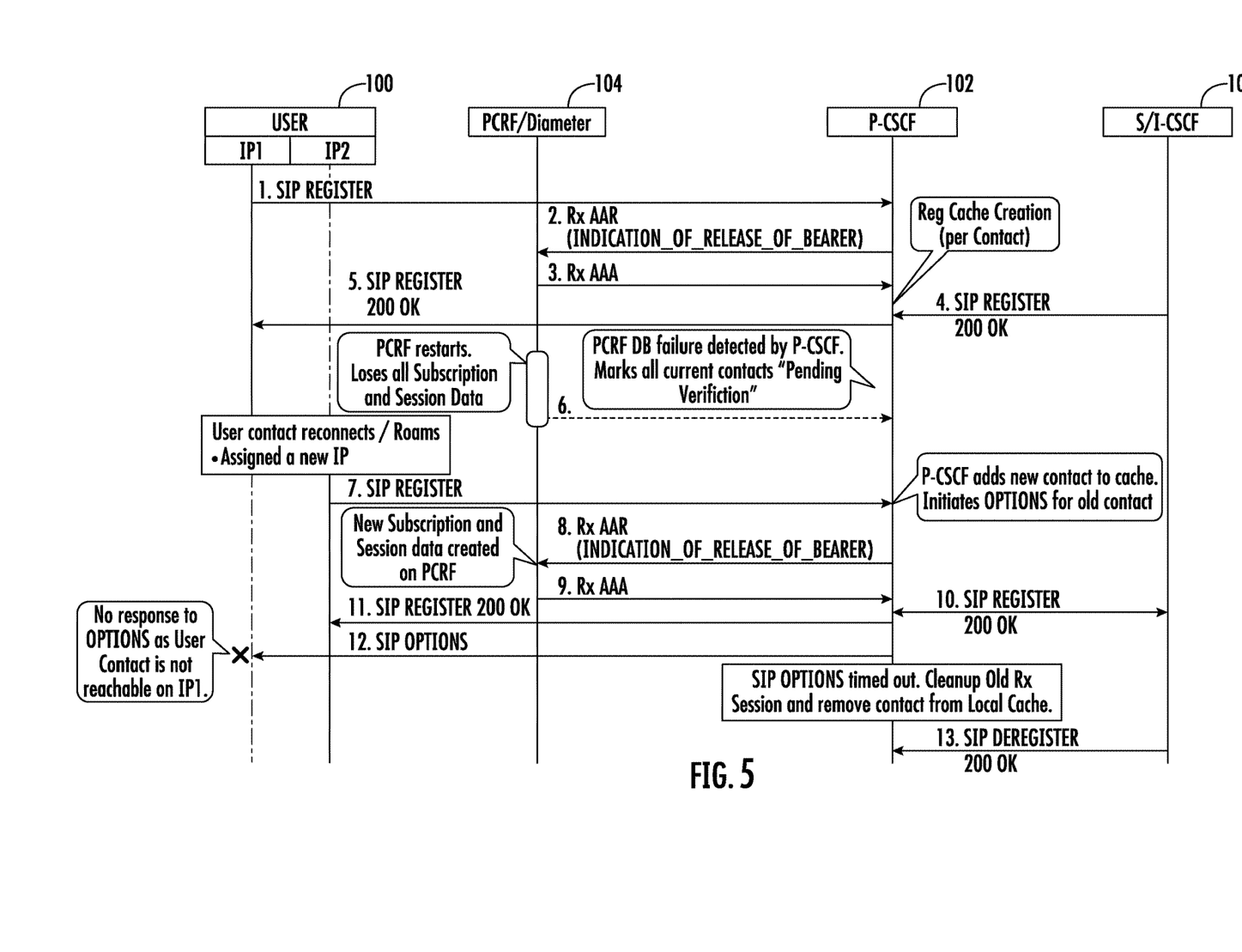
FIG. 5 is a message flow diagram illustrating exemplary messages exchanged when an IMS user device registers with the network, a PCRF database failure occurs, the user device roams to a new network or connects with a new IP address, and the P-CSCF detects, using a SIP OPTIONS request message timeout, that the original user contact is no longer reachable and frees resources associated with the original user contact.
Figure 6:
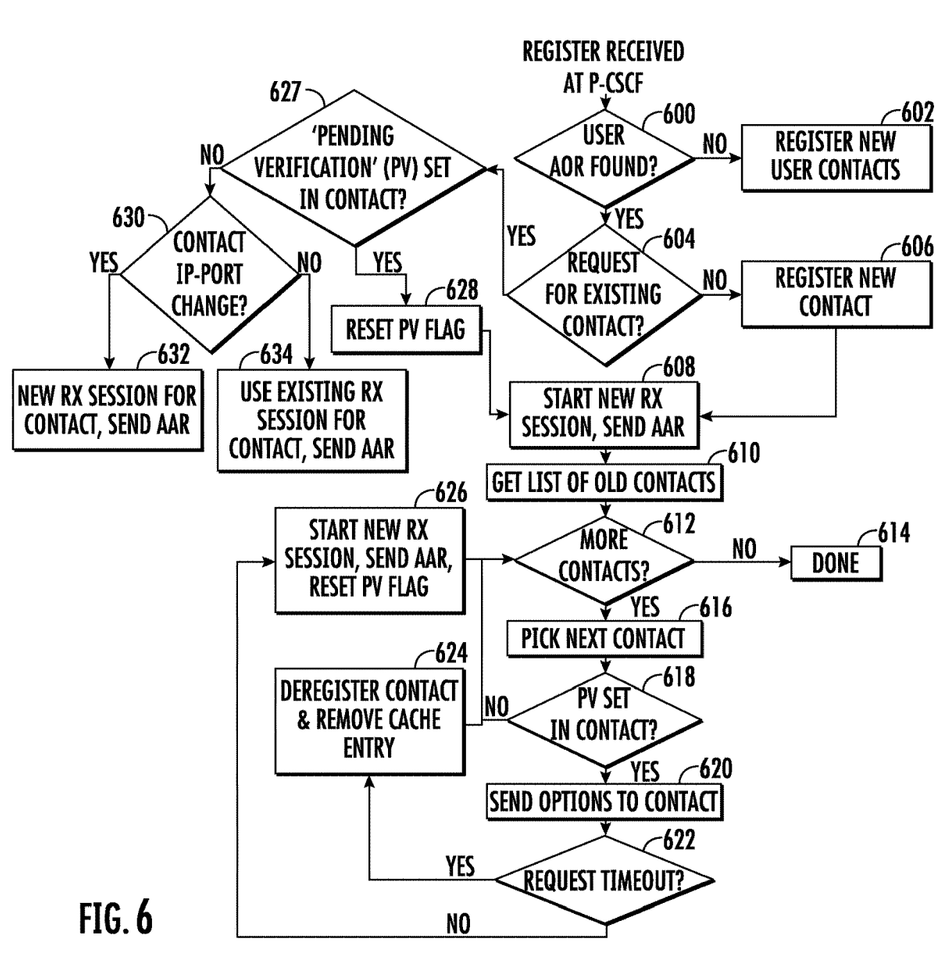
FIG. 6 is a flow chart illustrating an exemplary process performed by a P-CSCF when a PCRF database failure occurs and when processing a SIP REGISTER request message, including detecting stale user contacts and freeing P-CSCF resources associated with the stale user contacts.

The proposed solution is depicted in FIG. 5 and FIG. 6. Referring to FIG. 5, in line 1, user device 100 initiates registration with the network using the IP address IP1 and sends a SIP REGISTER request including the IP address IP1 to P-CSCF 102. In line 2, P-CSCF 102 initiates an Rx session with a PCRF 104 by sending an AAR message to PCRF 104. The AAR message includes a request be to subscribed to an INDICATION_OF_RELEASE_OF_BEARER for the bearer channel of the user contact registering using IP1. In line 3, PCRF 104 confirms successful creation of the subscription by sending an AAA message on the Rx interface to P-CSCF 102. P-CSCF 102 receives the AAA message, and, in response to receiving the AAA message, P-CSCF 102 creates an entry in its registration cache for the user contact registered using IP1.

In line 4, P-CSCF 102 sends a SIP REGISTER request to S/I-CSCF 106, and S/I-CSCF 106 responds to P-CSCF 102 with a 200 OK message indicating successful completion of the registration. In line 5, P-CSCF 102 sends a 200 OK message to user device 100 confirming successful creation of the registration.

After line 5, PCRF 104 loses all of its subscription data, for example, due to a subscription database failure and loses transport layer and Diameter connectivity with P-CSCF 102. P-CSCF 102 detects the transport layer and/or Diameter layer connection failure. In line 6, P-CSCF 102 determines, based on a change in the Origin-State-Id in one or more of the Diameter messages that reestablished the Diameter connection with PCRF 104 that PCRF 104 may have lost its subscription database and marks all user contacts in the registration cache of P-CSCF 102 as "pending verification". It should be noted that detecting a connection failure is not a precondition to detecting a PCRF database failure, as a PCRF database failure may be detected based on a change in Origin-State-Id in any message received from PCRF 104.

In FIG. 5, it is assumed that user device 100 disconnects from the original network, roams into a new network or reconnects to the existing network, is assigned a new IP address IP2, connects to the new network or reconnects to the existing network using IP2. In line 7, user device 100 sends a SIP REGISTER message to P-CSCF 102 to register the contact that uses IP2 with the network. In line 8, P-CSCF 102 sends an AAR message to PCRF 104 requesting to be notified of release of bearer events for the user contact that uses IP2. PCRF 104 creates a new subscription and session database entry for the user contact that uses IP2. In line 9, PCRF 104 responds to P-CSCF 102 with an AAA message confirming successful creation of the subscription.

In line 10, P-CSCF 102 sends a SIP REGISTER request to S/I-CSCF 106, and S/I-CSCF 106 sends a 200 OK message to P-CSCF 102 confirming successful registration of the contact for user contact that uses IP2. In line 11, P-CSCF 102 sends a 200 OK message to user device 100 in response to the SIP REGISTER request in line 7.

In response to receiving a new SIP register request for an AOR that is of record in the registration cache, P-CSCF initiates testing of all of the user contacts associated with the AOR identified in the SIP REGISTER request to determine if the user contacts are still reachable or stale. FIG. 5 shows messages exchange to test one of the user contacts. In line 12, P-CSCF 102 a SIP OPTIONS message to user device 100 for the contact that used IP1. Since the contact that used IP1 is no longer active, user device 100 does not respond within the SIP OPTIONS timeout period, and P-CSCF 102 determines from the timeout that the user contact that used IP1 is no longer active. Accordingly, P-CSCF 102 cleans up the Rx session and deletes the entry in the local registration cache for the contact that used IP1. Cleaning up the Rx session may include deleting entries in the Rx session database for the contact that used IP1. In line 13, P-CSCF 102 sends a SIP deregister request to S/I-CSCF 106 for the user contact that used IP1, and S/I-CSCF responds with a 200 OK message confirming successful deregistration of the contact that used IP1.

FIG. 6 illustrates operations performed by a P-CSCF when a transport connection failure occurs between the P-CSCF and the PCRF and also how the P-CSCF processes a SIP REGISTER request and frees resources associated with stale registration cache entries. The left hand flow chart in FIG. 6 illustrates exemplary operations performed by the P-CSCF when a PCRF transport connection failure is detected by the P-CSCF. When a transport failure with the PCRF is detected, in step 550, the P-CSCF initiates a new connection with the PCRF. The new connection may be or include a transport layer connection and a Diameter connection. In step 552, the P-CSCF determines whether the Origin-State-Id used by the PCRF has changed. If the Origin-State-Id has changed, one or more registrations maintained by the P-CSCF be stale because the PCRF is unable to notify the P-CSCF of release of bearer events. If the Origin-State-Id has changed, control proceeds to step 554 where the P-CSCF marks all entries in its registration cache as pending verification. In step 552, if the P-CSCF determines that the Origin-State-Id has not changed, control proceeds to step 556 where the P-CSCF continues with existing Rx sessions and reestablishes a Diameter connection with the PCRF.

The right-hand flow chart in FIG. 6 illustrates operations performed by the P-CSCF when a SIP REGISTER request message is received by the P-CSCF. In step 600, when a SIP REGISTER request message is received, the P-CSCF determines whether the user address of record obtained from the SIP REGISTER request is found in the registration cache maintained by the P-CSCF. If the user address of record is not in the registration cache, control proceeds to step 602 where the P-CSCF initiates the process of registering new user contacts for the AOR. There are no stale entries to delete for this AOR, since the AOR in the SIP REGISTER request is not present in the registration cache.

Returning to step 600, if the user address of record identified in the SIP REGISTER request is found in the registration cache, control proceeds to step 604 where the P-CSCF determines whether the request is for an existing contact. If the instance-id and reg-id are present in the SIP REGISTER request, the P-CSCF may use these parameters to determine if the request is for the same contact or a new contact. If the instance-id and reg-id are not present, the P-CSCF may determine that a change in IP address and/or port indicates a request for a new contact. If the SIP REGISTER request is not for an existing contact, control proceeds to step 606, where the P-CSCF registers a new contact for the address of record and IP address identified in the SIP REGISTER request. Control then proceeds to step 608 where the P-CSCF initiates a new Rx session with the PCRF and sends an AAR message to the PCRF.

In step 610, the P-CSCF gets the list of old contacts for the AOR identified in the SIP REGISTER request from the registration cache. In step 612, the P-CSCF determines whether there are more contacts in the list. If there are more contacts in the list, control proceeds to step 614 where the contact verification process ends because there are no more contacts in the list.

If the P-CSCF determines that there are more contacts in the list, control proceeds to step 616 where the P-CSCF selects the next contact. Control then proceeds to step 618 where the P-CSCF determines whether the pending verification flag is set for the contact. If the pending verification flag is set for the contact, control proceeds to step 620 where the P-CSCF sends a SIP OPTIONS request message to the contact to determine whether the contact is still in use and reachable. In step 622, the P-CSCF determines whether the SIP OPTIONS request has timed out. If the SIP OPTIONS request has timed out, control proceeds to step 624, where the P-CSCF deregisters the contact and removes the cache entry for the contact from the registration cache.

In step 622, if the P-CSCF determines that the SIP OPTIONS request did not time out, i.e., because the P-CSCF received a response to the SIP OPTIONS request from the user device within the SIP OPTIONS timeout period, control proceeds to step 626 where the P-CSCF starts a new Rx session, sends an AAR message to the PCRF, and resets the pending verification flag for the contact. In an alternate implementation, the P-CSCF may reset the pending verification flag for the contact in step 620 just before sending the SIP OPTIONS request to avoid any race conditions. Control then proceeds to step 612 where the process of checking the list of contacts begins again for the next contact in the list. Steps 612-626 are repeated until all of the contacts in the list have been tested. The P-CSCF actively tests contacts, identifies those that are no longer reachable, removes the corresponding cache entries, and deregisters the contacts with the S/I-CSCF.

In step 618, if the P-CSCF determines that the pending verification flag is not set for the contact, control returns to step 612 where it is determined whether there are more contacts to be tested. If there are more contact to be tested, steps 616-626 are repeated for each contact.

Returning to step 604, if the P-CSCF determines that the SIP REGISTER request is for an existing contact, control proceeds to step 627 where the P-CSCF determines whether the pending verification flag is set for the contact. If the pending verification flag is set, control proceeds to step 628 where the P-CSCF resets the pending verification flag. The reason for resetting the pending verification flag is that the receipt of the SIP REGISTER request for the contact means that the contact is still active, and there is no need to test the reachability of the contact. Control then proceeds to step 608 where the P-CSCF starts a new Rx session and sends an AAR message to the PCRF. Steps 610 through 626 are then executed to test the remaining contact in the list. It should also be noted that the P-CSCF may reset the pending verification flag for an existing user contact in response to receiving any SIP message from the contact, e.g., a SIP INVITE request, because receiving a SIP message from an existing contact means that the contact is still connected to the network.

Returning to step 627, if the P-CSCF determines that the pending verification flag is not set for the contact, control proceeds to step 630 where the P-CSCF determines whether there has been an IP address and/or port change for the contact. If there has been an IP address and/or port change for the contact, control proceeds to step 632 where the P-CSCF starts a new Rx session for the contact and sends an AAR message to the PCRF. In step 630, if the P-CSCF determines that there has not been an IP address and/or port change for the contact, control proceeds to step 634 where the P-CSCF uses the existing Rx session for the contact and sends an AAR message to the PCRF.

Figure 7:
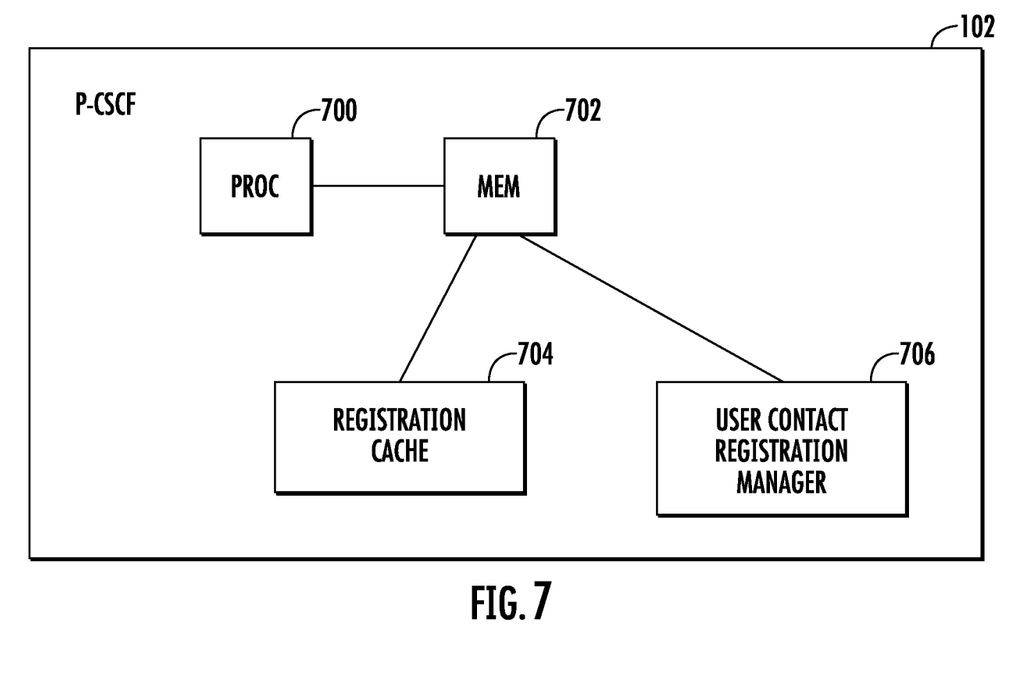
FIG. 7 is a block diagram of an exemplary architecture for a P-CSCF that implements the subject matter described herein.

FIG. 7 is a block diagram of an exemplary architecture for a P-CSCF that implements the subject matter described herein. Referring to FIG. 7, P-CSCF 102 includes at least one processor 700 and memory 702. P-CSCF 102 includes a registration cache 704 stored in memory 702 that includes cache entries for user contacts registered with the network. P-CSCF 102 further includes a user contact registration manager 706 that performs the steps described above with respect to FIGS. 5 and 6. User contact registration manager 706 may be implemented using computer executable instructions stored in memory 702 and executed by processor 700.

The subject matter described herein thus provides for identification and handling of PCRF subscription loss at the P-CSCF by performing proactive stale registration cleanup and restoration of lost Rx subscriptions at the PCRF. Advantages of the subject matter described herein include early detection of stale registrations at the P-CSCF in the problematic scenarios mentioned above. This not only saves resources (e.g., memory) by deleting such stale records, but also prevents undesired behavior for these users (such as attempting a call to an unavailable contact). A less preferred solution to testing user contacts when a PCRF database failure is detected could be to send AAR messages to the PCRF for all registered user contacts after a PCRF connection failure (without determining whether a PCRF database loss has occurred). However, sending AAR messages for all registered user contacts without determining whether a database failure has occurred would create unnecessary overhead on the network.

The disclosure of each of the following references is hereby incorporated herein by reference in its entirety.

REFERENCES

1. Jennings et al., Managing Client-Initiated Connections in the Session Initiation Protocol (SIP) IETF RFC 5626 October 2009.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for handling Internet protocol (IP) multimedia subsystem (IMS) registrations at a proxy call session control function (P-CSCF) after a policy and charging rules function (PCRF) database failure, the method comprising:

receiving, by the P-CSCF and after a PCRF database failure, a session initiation protocol (SIP) REGISTER request message;

determining, by the P-CSCF, that the SIP REGISTER request message is for an existing user; and in response to determining that the SIP REGISTER request message is for an existing user:

obtaining, by the P-CSCF, a list of user contacts having entries in a registration cache of the P-CSCF corresponding to an address of record in the SIP REGISTER request message;
testing, by the P-CSCF, reachability of the user contacts in the list and determining that at least one of the user contacts is unreachable; and
freeing, by the P-CSCF, resources of the P-CSCF for the at least one of the user contacts determined to be unreachable.

2. The method of claim 1 comprising:
detecting, by the P-CSCF, loss of connectivity with the PCRF;
determining, by the P-CSCF, that the PCRF database failure has occurred; and
in response to determining that the PCRF database failure has occurred, setting, by the P-CSCF, a pending verification flag for user contact entries in the registration cache.

3. The method of claim 2 wherein detecting loss of connectivity with the PCRF comprises detecting loss of a transport layer connection with the PCRF.

4. The method of claim 1 comprising detecting the PCRF database failure by:
receiving a Diameter message from the PCRF;
reading an Origin-State-Id from the Diameter message;
determining that the Origin-State-Id in the Diameter message differs from an Origin-State-Id of a previous Diameter connection with the PCRF.

5. The method of claim 1 comprising, in response to determining that the SIP REGISTER request message is not for an existing user, starting a new Rx session with the PCRF for a user contact identified in the SIP REGISTER request message.

6. The method of claim 1 wherein testing reachability of the user contacts in the list includes, for each of the user contacts in the list:
transmitting a message to the user contact;
starting a response timer for the user contact; and
determining that the user contact is unreachable in response to failing to receive a response from the user contact prior to expiration of the response timer.

7. The method of claim 6 wherein transmitting a message to the user contact includes transmitting a SIP OPTIONS request message to the user contact.

8. The method of claim 6 comprising determining that the user contact is reachable when a response to the SIP OPTIONS request message is received from the user contact prior to expiration of the response timer.

9. The method of claim 1 wherein freeing, by the P-CSCF, resources associated with the at least one of the user contacts includes deleting an entry in the registration cache corresponding to the at least one of the user contacts and sending a SIP deregister request message to a serving/interrogating CSCF (S/I-CSCF).

10. The method of claim 2 comprising receiving, by the P-CSCF, a SIP message from a user contact corresponding to one of the user contact entries in the list for which the pending verification flag is set or completing a mobile terminated call to the user contact, and, in response, resetting the pending verification flag for the entry and refraining from testing the user contact for reachability.

11. A system for handling Internet protocol (IP) multimedia subsystem (IMS) registrations at a proxy call session control function (P-CSCF) after a policy and charging rules function (PCRF) database failure, the system comprising:
a P-CSCF including at least one processor and a memory;
a user contact registration cache stored in the memory and having entries corresponding to user contacts registered with an IMS network; and
a user contact registration manager stored in the memory and executable by the at least one processor for:
receiving a session initiation protocol (SIP) REGISTER request message after a PCRF database failure;
determining that the SIP REGISTER request message is for an existing user; and
in response to determining that the SIP REGISTER request message is for an existing user:
obtaining a list of user contacts having entries in a registration cache of the P-CSCF corresponding to an address of record in the SIP REGISTER request message;
testing reachability of the user contacts having user contact entries in the list and determining that at least one of the user contacts is unreachable; and
freeing resources of the P-CSCF for the at least one of the user contacts determined to be unreachable.

12. The system of claim 11 wherein the user contact registration manager is configured to:
detect loss of connectivity with the PCRF;
determine that the PCRF database failure has occurred; and
in response to determining that the PCRF database failure has occurred, set a pending verification flag for user contact entries in a registration cache maintained by the P-CSCF.

13. The system of claim 12 wherein the user contact registration manager is configured to detect loss of connectivity with the PCRF by detecting loss of a transport layer connection with the PCRF.

14. The system of claim 11 wherein the user contact registration manager is configured to detect the PCRF database failure by:
receiving a Diameter message from the PCRF;
reading an Origin-State-Id from the Diameter message;
determining that the Origin-State-Id in the Diameter message differs from an Origin-State-Id of a previous Diameter connection with the PCRF.

15. The system of claim 11 wherein the user contact registration manager is configured to, in response to determining that the SIP REGISTER request message is not for an existing user, starting a new Rx session with the PCRF for a user contact identified in the SIP REGISTER request message.

16. The system of claim 11 wherein the user contact registration manager is configured to test reachability of each of the user contacts in the list by:
transmitting a message to the user contact;
starting a response timer for the user contact; and
determining that the user contact is unreachable in response to failing to receive a response from the user contact prior to expiration of the response timer.

17. The system of claim 16 wherein the message transmitted to the user contact comprises a SIP OPTIONS request message.

18. The system of claim 16 wherein the user contact registration manager is configured to determine that the user contact is reachable when a response to the SIP OPTIONS request message is received from the user contact prior to expiration of the response timer.

19. The system of claim 11 wherein the user contact registration manager is configured to free resources associated with the at least one of the user contacts by deleting an entry in the registration cache corresponding to the at least one of the user contacts.

20. A non-transitory computer readable medium having stored thereon executable instructions that when executed by a processor of a computer controls the computer to perform steps comprising:

receiving, by a proxy call session control function (P-CSCF) and after a policy and charging rules function (PCRF) database failure, a session initiation protocol (SIP) REGISTER request message;

determining, by the P-CSCF, that the SIP REGISTER request message is for an existing user; and in response to determining that the SIP REGISTER request message is for an existing user:

obtaining, by the P-CSCF, a list of user contacts having entries in a registration cache of the P-CSCF corresponding to an address of record in the SIP REGISTER request message;

testing, by the P-CSCF, reachability of the user contacts in the list and determining that at least one of the user contacts is unreachable; and freeing, by the P-CSCF, resources of the P-CSCF for the at least one of the user contacts determined to be unreachable.

* * * * *

UNITED STATES PATENT AND TRADEMARK OFFICE
CERTIFICATE OF CORRECTION

PATENT NO. : 12,206,714 B1
APPLICATION NO. : 18/223534
DATED : January 21, 2025
INVENTOR(S) : Grover et al.

Page 1 of 1

It is certified that error appears in the above-identified patent and that said Letters Patent is hereby corrected as shown below:

In the Drawings

On sheet 5 of 7, in FIG. 5, Line 11, delete "Verifiction"" and insert -- Verification" --, therefor.

In the Specification

In Column 5, Line 43, delete "(VOLTE)" and insert -- (VoLTE) --, therefor.

In Column 11, Line 20, delete "be to" and insert -- to be --, therefor.

In Column 14, Line 47, delete "5626" and insert -- 5626, --, therefor.

Signed and Sealed this
Eighth Day of April, 2025

Coke Morgan Stewart
*Acting Director of the United States Patent and Trademark Office*